(12) United States Patent
Lee et al.

(10) Patent No.: US 7,252,428 B2
(45) Date of Patent: Aug. 7, 2007

(54) PRISM SHEET OF LIQUID CRYSTAL DISPLAY DEVICE AND BACKLIGHT UNIT USING THE SAME

(75) Inventors: Sang Gou Lee, Daegu-si (KR); Chang Jong Kim, Cheongju-si (KR); Young Gun Kim, Cheongju-si (KR); Yun Ho Choi, Seoul (KR); Ho Sung Chin, Seoul (KR); Bong Taek Hong, Cheongju-si (KR); Kab Jin Hwang, Cheongju-si (KR); Ung Sang Lee, Cheongju-si (KR); Chul Young Kim, Seoul (KR)

(73) Assignee: LG.Electronics, Inc., Seoul (KR)

( * ) Notice: Subject to any disclaimer, the term of this patent is extended or adjusted under 35 U.S.C. 154(b) by 178 days.

(21) Appl. No.: 11/024,767

(22) Filed: Dec. 30, 2004

(65) Prior Publication Data

US 2006/0002149 A1    Jan. 5, 2006

(30) Foreign Application Priority Data

Jul. 2, 2004   (KR) ...................... 10-2004-0051490

(51) Int. Cl.
*F21V 5/02* (2006.01)

(52) U.S. Cl. ...................... 362/628; 362/619; 362/620; 349/64

(58) Field of Classification Search .................. 349/57, 349/62–64; 362/607, 618, 619–620, 628
See application file for complete search history.

(56) References Cited

U.S. PATENT DOCUMENTS

| | | | |
|---|---|---|---|
| 2,248,638 A | 7/1941 | Merton | |
| 4,542,449 A | 9/1985 | Whitehead | |
| 4,906,070 A | 3/1990 | Cobb, Jr. | |
| 5,056,892 A | 10/1991 | Cobb, Jr. | |
| 6,204,903 B1* | 3/2001 | Hayashi et al. | 349/113 |
| 6,272,275 B1* | 8/2001 | Cortright et al. | 385/129 |
| 2002/0003593 A1* | 1/2002 | Arakawa et al. | 349/65 |
| 2002/0181223 A1* | 12/2002 | Ryu et al. | 362/31 |
| 2003/0095400 A1* | 5/2003 | Kashima et al. | 362/31 |
| 2004/0061944 A1* | 4/2004 | Kashima et al. | 359/599 |
| 2005/0213312 A1* | 9/2005 | Kwon | 362/29 |

* cited by examiner

*Primary Examiner*—Laura Tso
(74) *Attorney, Agent, or Firm*—McKenna Long & Aldridge LLP

(57) ABSTRACT

A prism sheet of an LCD includes a body part made of a transparent resin material and a plurality of polypyramid-shaped optical unit structures formed in a intaglio type on the body part. The plurality of optical unit structures have intaglio-type polypyramid shapes in an inside of their polygonal structure. A center of the intaglio portion corresponds to a vertex of the polypyramid, thereby forming a point.

21 Claims, 6 Drawing Sheets

PRISM SHEET OF LIQUID CRYSTAL DISPLAY DEVICE AND BACKLIGHT UNIT USING THE SAME

This application claims the benefit of Korean Patent Application No. 2004-51490, filed on Jul. 2, 2004, which is hereby incorporated by reference for all purposes as if fully set forth herein.

BACKGROUND OF THE INVENTION

1. Field of the Invention

The present invention relates to a non-luminous flat display device, and more particularly, to an optical sheet of a backlight unit in a liquid crystal display device.

2. Discussion of the Related Art

Recently, a variety of flat panel displays have been developed to overcome weight and volume drawbacks of cathode ray tubes (CRTs).

Such flat panel displays include a liquid crystal display (LCD) device, a field emission display, a plasma display panel (PDP), an electro-luminescence (EL) and the like. Research for enhancing the display quality and increasing the screen size of the flat panel displays are being actively performed.

Among such flat panel displays, the LCD itself is a non-luminous device, which displays images using a light source such as a lamp and has advantages of small size, lightweight, low power consumption characteristics. In particular, the LCD displays information using electrical and optical properties of liquid crystal molecules interposed in an inside of a liquid crystal display.

Unlike the CRT, the LCD essentially needs a separate unit for irradiating light, i.e., a backlight unit, because the liquid crystal molecules interposed between a thin film transistor (TFT) substrate and a color filter substrate do not emit light on their own.

The backlight unit includes: a mold frame having a receiving space; a reflector mounted on the lowest surface of the receiving space for reflecting light toward a liquid crystal display panel; a light guide plate disposed on the reflector for guiding light; a lamp unit disposed between the light guide plate and a sidewall of the receiving space for emitting light; optical sheets stacked on the light guide plate for diffusing and concentrating light; and a top chassis disposed on the mold frame for enclosing the liquid crystal display from a predetermined portion of the edge of the liquid crystal display to a side portion of the mold frame.

The optical sheets include: a diffusion sheet for diffusing light; a prism sheet disposed on the diffusion sheet for concentrating the diffused light and transferring the concentrated light to the liquid crystal display; and a protective sheet for protecting the diffusion sheet and the prism sheet.

FIG. 1 is a cross-sectional view of a related art LCD.

Referring to FIG. 1, the related art LCD 60 includes: a backlight unit 50 for generating light; and a display unit 40 for receiving the light from the backlight unit 50 and displaying images.

The backlight unit 50 includes: a lamp unit 51 for generating light; and a light guide unit for guiding the light generated by the lamp unit 51 toward the liquid crystal display 10.

The display unit 40 includes: the liquid crystal display panel 10; and an upper polarizer 30 and a lower polarizer 20 respectively disposed on an upper surface and a lower surface of the liquid crystal display panel 10. The liquid crystal display panel 10 includes: a TFT substrate 11; a color filter substrate 12 each having electrodes formed thereon; and a liquid crystal layer interposed between the TFT substrate 11 and the color filter substrate 12.

More specifically, the lamp unit 51 includes: a lamp 51a for generating light; and a lamp reflector 51b enclosing the lamp 51a. The light generated by the lamp 51a is provided into a light guide plate 52, which will be described later. The lamp reflector 51b reflects the light generated by the lamp 51a toward the light guide plate 52, thereby increasing amount of light provided to the light guide plate 52.

The light guide unit includes a reflective plate 54, the light guide plate 52, and optical sheets 53. The light guide plate 52 is disposed at one end of the lamp unit 51 to guide the light emitted from the lamp unit 51 so that the light emitted from the lamp unit 51 is incident into the LCD panel 10.

The reflective plate 54 is disposed beneath the light guide plate 52 and reflects light leaked from the light guide plate 52 toward the light guide plate 52 again.

The plurality of optical sheets 53 are disposed on the light guide plate 52 to enhance efficiency of the light passing through the light guide plate 52. Specifically, the optical sheets 53 include a diffusion sheet 53a, a prism sheet 53b, and a protective sheet 53c, and are sequentially stacked on the light guide plate 52.

The diffusion sheet 53a scatters the light that is incident from the light guide plate 52, thereby making the brightness distribution of the light uniform. The prism sheet 53b has a plurality of prisms repeatedly formed on its upper surface and concentrates the light diffused by the diffusion sheet 53a in a direction perpendicular to a plane of the LCD panel 10. Accordingly, the light that has passed through the prism sheet 53b mostly progresses in a direction perpendicular to the plane of the LCD panel 10, so that a uniform brightness distribution is obtained.

The protective sheet 53c provided on the prism sheet 53b functions not only to protect the upper surface of the prism sheet 53b, but also to diffuse light so as to make uniform the distribution of the light that is incident from the prism sheet 53b.

FIGS. 2A and 2B are a cross-sectional view and a perspective view of the prism sheet shown in FIG. 1, respectively.

Referring to FIGS. 2A and 2B, the related art prism sheet 200 includes: a body part 210 through which the light diffused by the light guide plate and the diffusion sheet is initially introduced, and a protrusion part 220 shaped in a isosceles triangle prism having a predetermined vertical angle α, for maintaining a path of the diffused light constantly. The protrusion part 220 has a plurality of isosceles triangle prisms linearly arranged on the body part 210 in a stripe form.

In case the protrusion part 220 of a triangle prism shape is installed toward a front side, namely, the protrusion part becomes a light outputting surface and faces the liquid crystal display panel, diffused light introduced from the body part 210 is refracted and concentrated to a front side, but light incident into an incline plane of the protrusion part is lost, not contributing to improvement of a front brightness due to a total internal refraction.

To overcome such a problem, the prism sheet may be conversely arranged so that the protrusion part 220 becomes a light receiving surface and faces the light guide plate. In this case, however, a front brightness can be improved but the viewing angle becomes narrow, which is not suitable for a flat display requiring a wide viewing angle such as a television for a home use.

Further, two prism sheets may be overlapped and used in such a way that arrangement directions of the protrusion parts thereof are crossed each other. However, such an arrangement increases a number of parts used in the LCD and manufacturing costs.

SUMMARY OF THE INVENTION

Accordingly, the present invention is directed to a prism sheet of an LCD and a backlight unit using the same that substantially obviates one or more problems due to limitations and disadvantages of the related art.

An advantage of the present invention is to provide a prism sheet of an LCD and a backlight unit using the same, capable of increasing/decreasing a brightness by forming intaglio-type polypyramid-shaped optical unit structures on one side of the prism sheet so as to concentrate light from all directions including up, down, left, and right.

To achieve these objects and other advantages and in accordance with the purpose of the invention, as embodied and broadly described herein, a prism sheet of an LCD includes: a body part made of a transparent resin material; and a plurality of polypyramid-shaped optical unit structures formed in a intaglio type on the body part, the plurality of optical unit structures having intaglio-type polypyramid shapes in an inside of their polygonal structures, a center of the intaglio portion corresponding to a vertex of the polypyramid, thereby forming a point.

In another aspect of the present invention, a backlight unit of an LCD includes: a lamp for generating light; a light guide plate arranged in one end of the lamp for guiding the light; a reflective plate arranged on a lower part of the light guide plate for preventing the light emitted from the lamp from leaking out; a diffusion sheet and a prison sheet arranged on an upper part of the light guide plate for improving efficiency of the light emitted from the light guide plate, the prism sheet having a body part made of a transparent resin material and a plurality of optical unit structures of a polypyramid shape formed in a intaglio on the body part, the plurality of optical unit structures having intaglio-type polypyramid shapes in an inside of their polygonal structure, a center of the intaglio portion corresponding to a vertex of the polypyramid, thereby forming a point.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENTS

Reference will now be made in detail to the embodiments of the present invention, examples of which are illustrated in the accompanying drawings.

Figure 1:
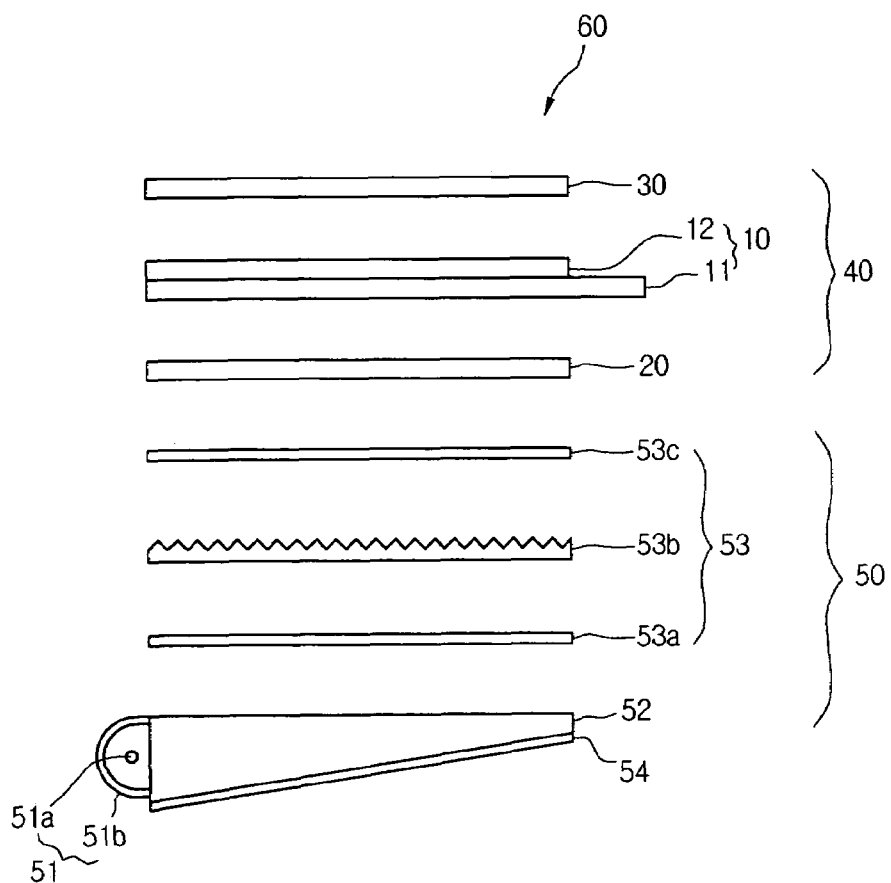
FIG. 1 is a cross-sectional view illustrating a construction of a related art LCD.
Figure 2A:
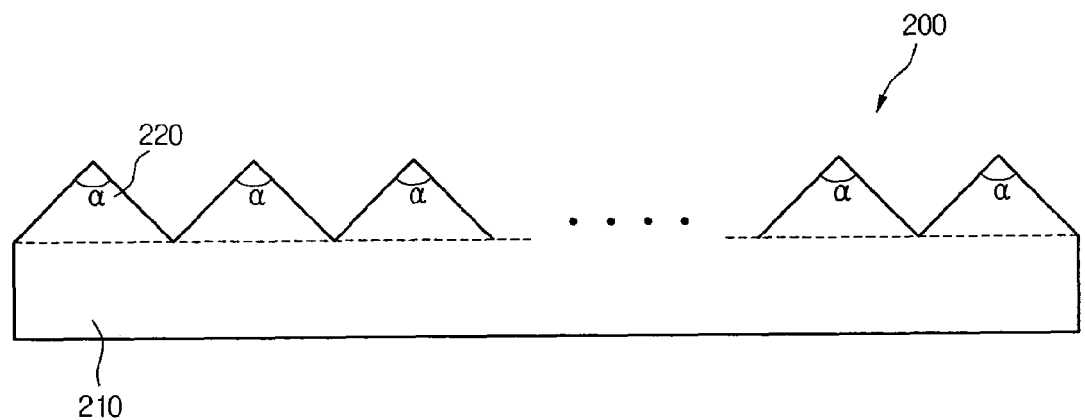
FIGS. 2A and 2B are a cross-sectional view and a perspective view of the prism sheet shown in FIG. 1, respectively.
Figure 2B:
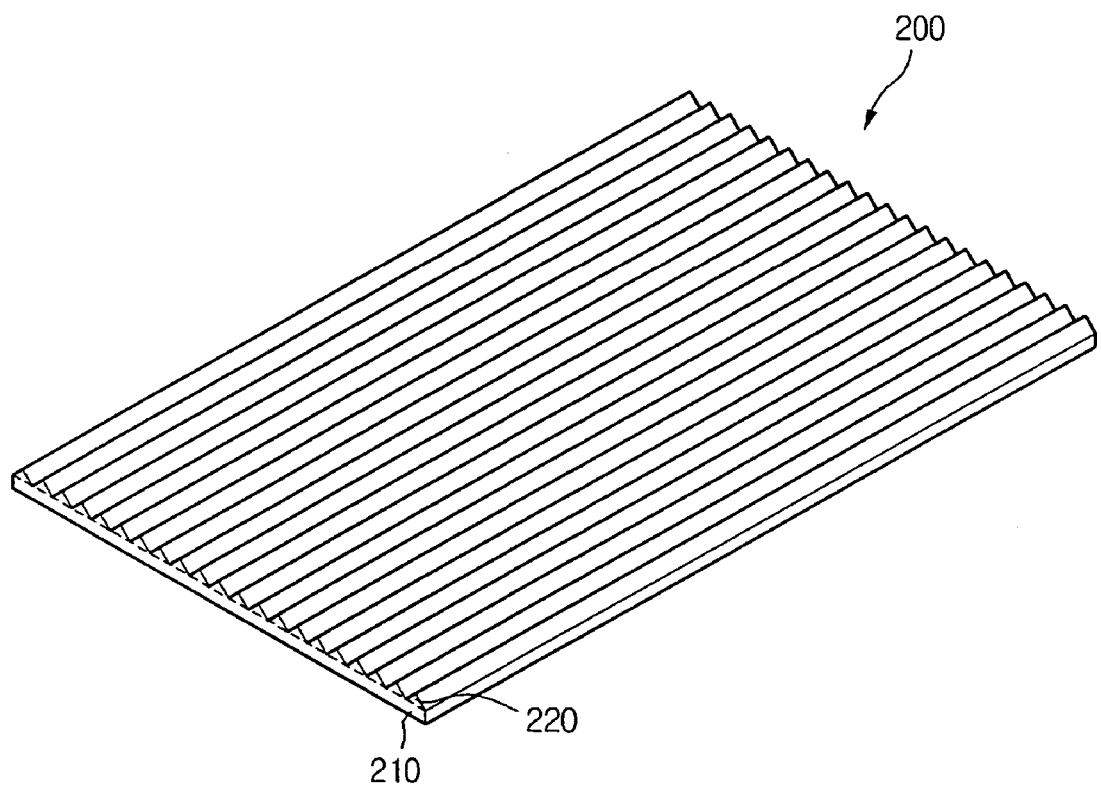
Figure 3A:
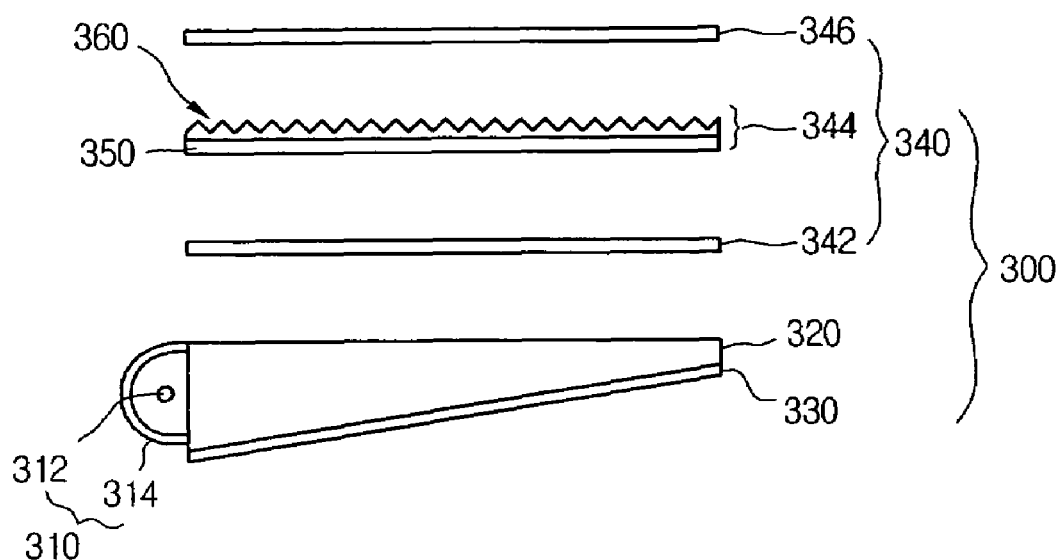
FIGS. 3A and 3B are cross-sectional views illustrating a construction of a backlight unit of an LCD according to the present invention.
Figure 3B:
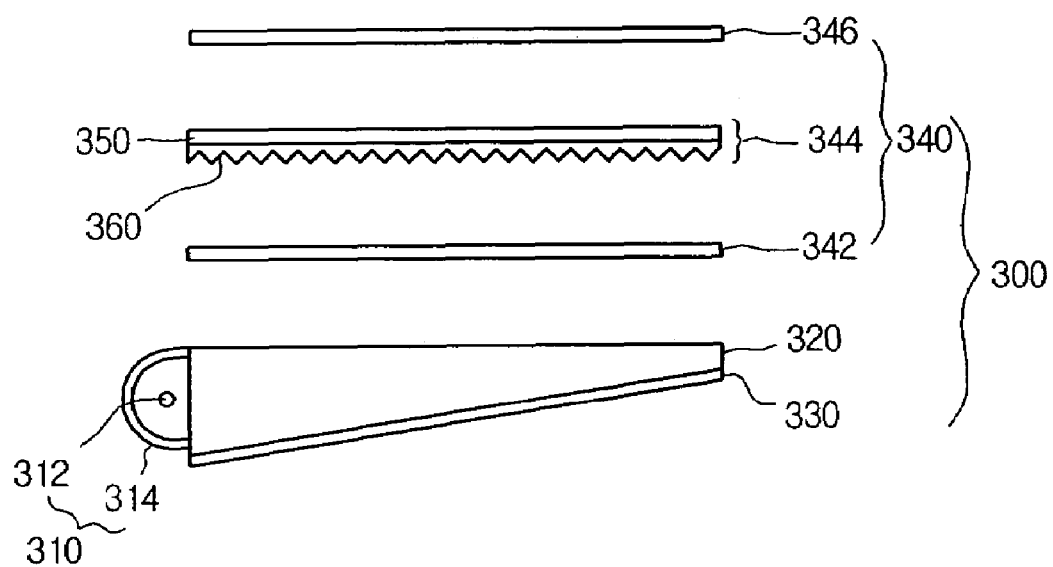

FIGS. 3A and 3B are cross-sectional views illustrating a construction of a backlight unit of an LCD according to the present invention.

Referring to FIGS. 3A and 3B, a backlight unit 300 according to the present invention includes a lamp unit 310 for generating light, and a light guide unit for guiding the light from the lamp unit 310 toward a liquid crystal display panel.

Here, the light guide unit has a plurality of optical sheets 340. Among those optical sheets 340, a prism sheet 344 is configured in such a way that a plurality of polypyramid-shaped optical unit structures 360 made of PMMA (Polymethylmethacrylate) are arranged on a body part made of a transparent resin material, such as PET (polyethyleneterephthalate) or PC (Polycarbonate).

At this point, the plurality of optical unit structures 360 arranged and formed on the prism sheet 344 is configured such that a polypyramid shape is formed in an intaglio or recessed type in an inside of their polygonal structure and a center of the intaglio portion, which corresponds to a vertex of the polypyramid, forms a point.

Further, when a light-concentrating degree of the prism sheet 344 and a viewing angle characteristics need to be adjusted or compromised, it is possible to obtain such an adjustment compromise by changing a shortest distance between central points of the optical unit structures formed in plural on the body part 350 and a depth of the optical unit structure.

For example, in case one side of the prism sheet 344 on which the optical unit structures 360 are formed becomes a light outputting surface, the light-concentrating degree may be designed such that the depth of the optical unit structure 360 is smaller than a shortest distance between central points of the intaglio-type optical unit structures 360. That is, the depth of the optical unit structure 360 may be determined in a range of about 0.3-0.6 times the shortest distance between the central points.

Further, even in case one side of the prism sheet 344 on which the optical unit structures 360 are formed becomes a light receiving surface, the light-concentrating degree may be designed such that the depth of the optical unit structure 360 is smaller than a shortest distance between central points of the intaglio-type optical unit structures 360. At this point, the depth of the optical unit structure may be determined in a range of about 0.5-0.8 times the shortest distance between the central points.

The transparent resin material constituting the body part 350 may have a transmittance of more than about 70%. The transparent resin material may be formed on one side of the body part, i.e., a surface opposite to the surface where the optical unit structures 360 are formed, by embossing small-sized protuberances acting as structures for diffusing light or by providing grains made of PMMA, which is a material for diffusing light into an inside of the body part.

Further, the lamp unit 310 includes: a lamp 312 for generating light; and a lamp reflector 314 enclosing the lamp 312. Light emitted from the lamp 312 is incident into a light guide plate 312 and the lamp reflective plate 330 improves an amount of light incident to the light guide plate 320 by reflecting the light emitted from the lamp 312 toward the light guide plate 320, which are the same as the construction of the general lamp unit.

Here, the light guide unit includes: the reflective plate 330; the light guide plate 320; and the optical sheets 340. The light guide plate 320 is provided to one side of the lamp unit 310 to guide the light emitted from the lamp unit 310. At this point, the light guide plate 320 changes a path of the light emitted from the lamp unit 310 to guide the light toward the liquid crystal display panel.

The reflective plate 330 is disposed beneath the light guide plate 320 and reflects light leaked from the light guide plate 320 back to the light guide plate 320.

The plurality of optical sheets 340 are disposed on the light guide plate 320 to enhance efficiency of the light that has passed through the light guide plate 320. Specifically, the optical sheets 340 include a diffusion sheet 342; a prism sheet 344; and a protective sheet 346. Those sheets are sequentially stacked on the light guide plate 320.

The diffusion sheet 342 scatters the light that is incident from the light guide plate 320, thereby making uniform the brightness distribution of the light.

Further, the above-described prism sheet 344 of the present invention may be arranged such that the plurality of intaglio-type optical unit structures is opposite to the diffusion sheet 342 as shown in FIG. 3A, or may be arranged such that the other surface on which the protrusion parts are not formed is opposite to the diffusion sheet 342, that is, the other surface becomes a light outputting surface as shown in FIG. 3B.

However, in case small-sized protuberances acting as structures for diffusing light are embossed on a surface of the body part of the prism sheet, i.e., a surface opposite to the surface where the optical unit structures are formed, the diffusion sheet may be omitted.

Further, the protective sheet 346 provided on the prism sheet 344 diffuses the light in order to make uniform a distribution of the light incident from the prism sheet 346 as well as protects a surface of the prism sheet 344. The protective sheet 346 may be removed depending on cases.

Figure 4A:
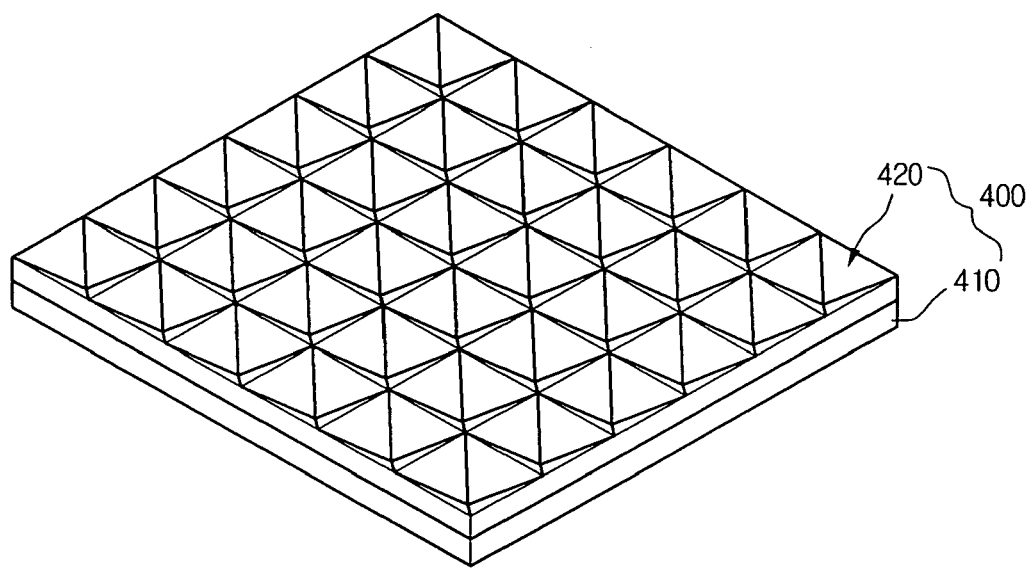
FIGS. 4A and 4B are a perspective view and a cross-sectional view illustrating a prism sheet of an LCD according to the present invention.
Figure 4B:
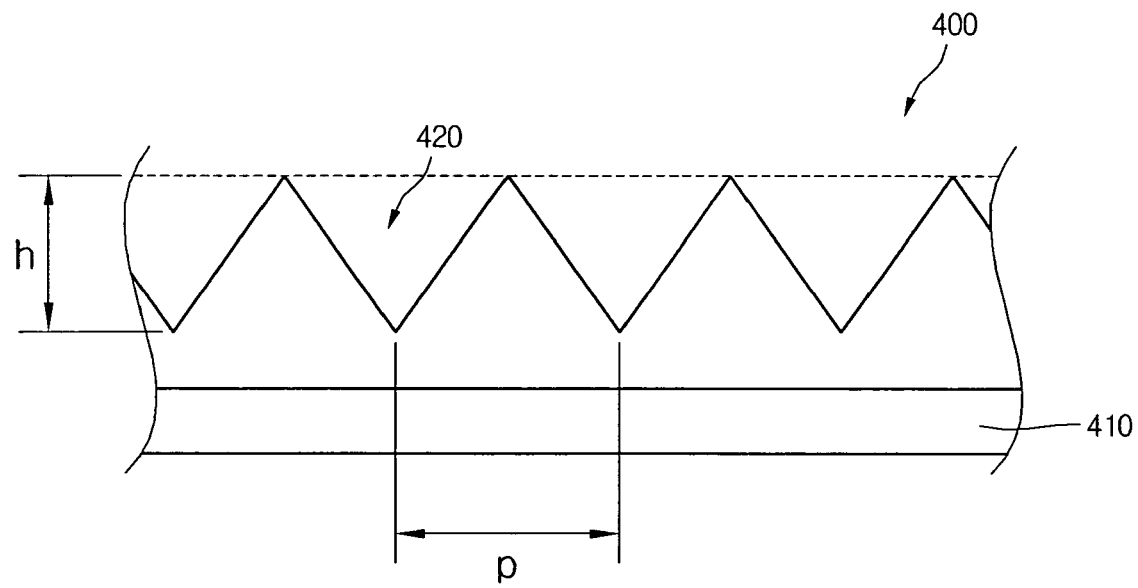

FIGS. 4A and 4B are a perspective view and a cross-sectional view illustrating a prism sheet of an LCD according to the present invention.

Here, the prism sheet explained with reference to FIG. 4 is the same as the prism sheet provided to the backlight unit explained earlier with reference to FIG. 3

As illustrated in FIG. 4, the prism sheet according to the present invention is configured in such a way that a plurality of intaglio-type polypyramid-shaped optical unit structures 420 made of PMMA(polymethylmethacrylate) is arranged on a body part made of a transparent resin material, such as PET(polyethyleneterephthalate) or PC(Polycarbonate).

Here, the transparent resin material constituting the body part may have a transmittance of more than 70%. The transparent resin material can be formed on one side of the body part, i.e., a surface opposite to the surface where the optical unit structures are formed, by embossing small-sized protuberances acting as structures for diffusing light or by providing grains made of PMMA, which is a material for diffusing light into an inside of the body part.

A thickness of the body part 410 may be at least more than 25 μm.

At this point, the plurality of optical unit structures 420 arranged and formed on the prism sheet 400 is configured such that a polypyramid shape is formed in an intaglio type in an inside of their polygonal structures and a center of the intaglio portion, which corresponds to a vertex of the polypyramid, forms a point.

That is, the intaglio-type polypyramid shape is of an intaglio cubic structure in which vertexes of more than three isosceles triangles meet at one point, i.e., a center of the intaglio portion, and the isosceles triangle's plane acts as a refraction plane of light.

For example, the optical unit structure 420 may be realized in form of an intaglio type quadrangular pyramid formed in an inside of a quadrangular structure as shown in FIG. 4.

Further, when a light-concentrating degree of the prism sheet and a viewing angle characteristics need to be compromised, it is possible to obtain such a compromise by adjusting a shortest distance p between central points of the optical unit structures 420 formed in plural on the body part 410 and a depth h of the optical unit structure.

For example, in case one side of the prism sheet on which the optical unit structures 420 are formed becomes a light outputting surface, the light-concentrating degree may be designed such that the depth of the optical unit structure 420 is smaller than a shortest distance between central points of the intaglio-type optical unit structures 420. That is, the depth h of the optical unit structure 420 may be determined in a range of about 0.3-0.6 times the shortest distance p between the central points.

Further, even in case one side of the prism sheet on which the optical unit structures 420 are formed becomes a light receiving surface, the light-concentrating degree may be designed such that the depth h of the optical unit structure 420 is smaller than a shortest distance p between central points of the intaglio-type optical unit structures 420. At this point, the depth h of the optical unit structure may be determined in a range of about 0.5-0.8 times the shortest distance p between the central points.

In addition, the depth h of the optical unit structure may be greater than at least about one fourth of the shortest distance p between the central points and may be greater than at least about 10 μm.

Further, since the optical unit structures formed in an intaglio type on the prism sheet of the present invention has a plurality of isosceles triangular planes, a viewing angle characteristics can be considerably improved using each of the isosceles triangular planes as a light receiving plane.

Figure 5A:
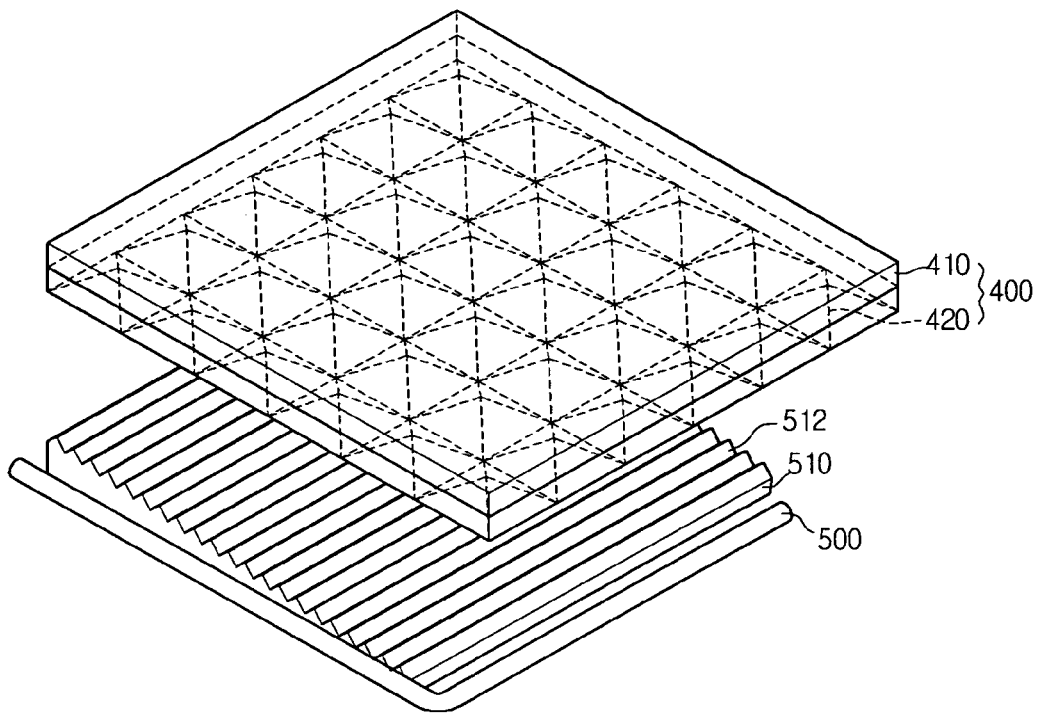
FIGS. 5A through 5C are perspective views illustrating part of a backlight unit according to an embodiment of the present invention.
Figure 5B:
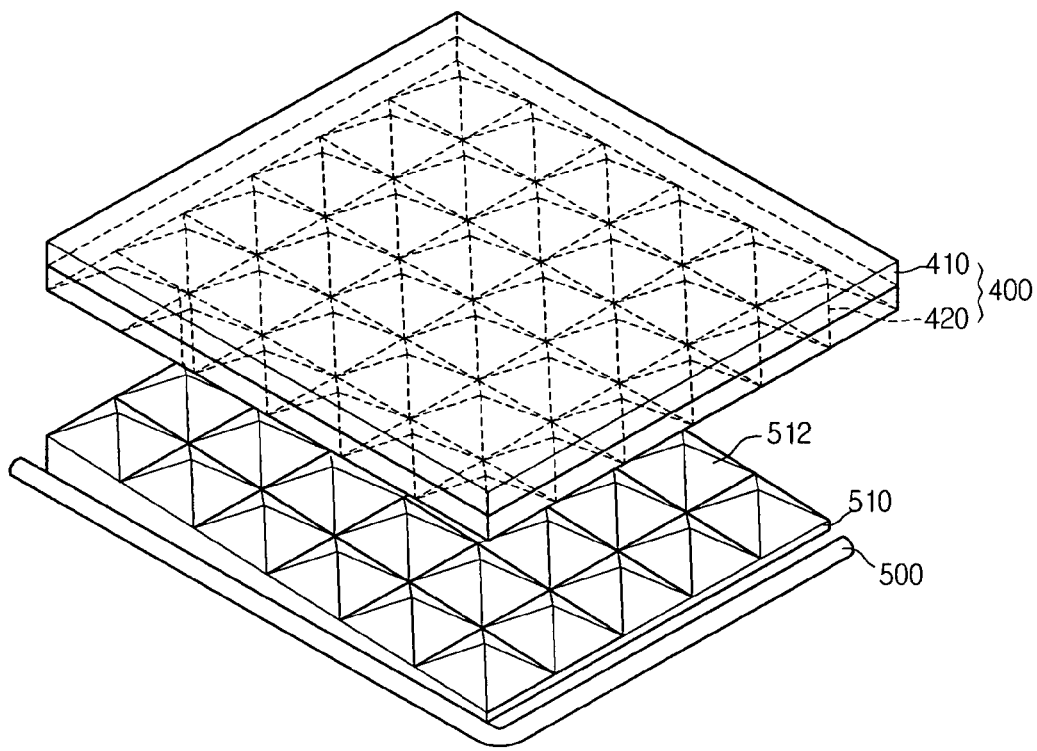
Figure 5C:
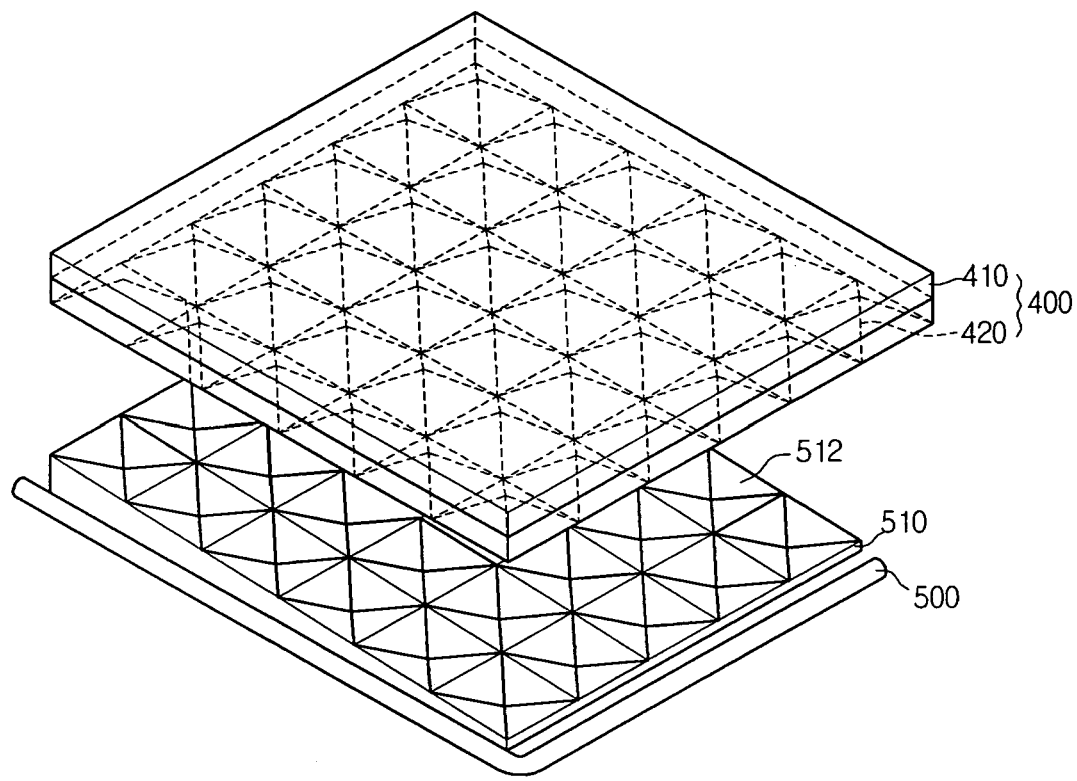

FIGS. 5A through 5C are perspective views illustrating part of a backlight unit according to an embodiment of the present invention.

Referring to FIGS. 5A through 5C, an edge-type backlight assembly adopting an "L"-shaped lamp 500 is illustrated. A plurality of protrusion parts 512 are formed on a surface of a light guide plate 510, so that about 80% of light incident to the light guide plate 510 is emitted at a specific angle (about 60-80°).

Here, the protrusion parts 512 formed on the surface of the light guide plate 510 may be formed in a stripe type of a prism shape as illustrated in FIG. 5A, or may be formed in a relief or an intaglio-type triangular pyramid as illustrated in FIGS. 5B or 5C.

The lamp 500 is formed in an "L" shape so as to simultaneously provide light to two non-facing sides of the light guide plate 510. More than one lamp 500 may be provided.

In that case, the prism sheet 400 of the present invention described with reference to FIG. 4 is inversely arranged, namely, optical unit structures 420 formed in an intaglio type on the prism sheet are arranged to face the light guide plate 510, whereby the light incident at a specific angle is refracted to various directions by a plurality of isosceles triangular planes constituting the optical unit structures 420 formed on the prism sheet 400 and uniform optical characteristics can be obtained over a wide range. That is, a viewing angle characteristics can be improved for all directions including up, down, left, and right.

Further, the plurality of intaglio-type polypyramid-shaped optical unit structures 420 formed on the body part 410 is formed such that liquid PMMA material is made into a intaglio through a relief mold and formed on the body part 410 and then hardened by an ultraviolet hardening method to be finally combined with the body part 410.

That is, for manufacturing of the prism sheet according to the present invention, a relief mold having almost the same size as the intaglio-type polypyramid-shaped optical unit structures formed on the prism sheet is used.

For the mold, a metallic material may be used or a material having a property that can be bent, such as a resin, may be used depending on case.

The mold may be prepared by forming a relief on a metal surface basically having a curved surface or by forming a relief on resin surface that can be bent, considering its exfoliation (extraction) property and handling property.

By manufacturing the prism sheet on which the intaglio-type polypyramid-shaped optical unit structures are formed using the relief mold as described above, it is possible to efficiently produce, with high productivity, the optical unit structures contributing to reflection and refraction of light.

That is, it is possible to raise a manufacturing speed and improve optical characteristics maximally by forming the optical unit structures of the prism sheet according to the present invention, using an intaglio method.

Figure 6:
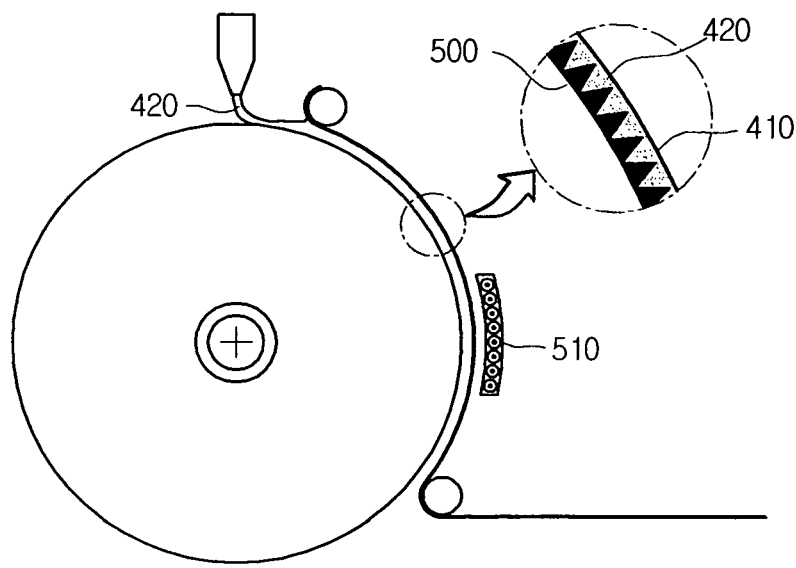
FIG. 6 is a view illustrating a method of manufacturing the prism sheet according to the present invention.

FIG. 6 is a view explaining a manufacturing of the prism sheet according to the present invention.

Referring to FIG. 6, the prism sheet according to the present invention is manufactured such that a transparent resin material 420 of liquid state is injected between a relief mold 500 and a body part 410 made of a transparent resin material, and an appropriate pressure is applied thereon; the liquid resin material is hardened by an ultraviolet apparatus 510 so as to be combined with the body part 410, so that the prism sheet is finally obtained by being exfoliating (extracting) from the relief mold 500.

A method for manufacturing a first mold having an excellent uniformity in its shape through a machine process using a ultra-hardness tool such as a diamond is already known in the art and the prism sheet of the present invention can be manufactured using the first relief mold obtained through the above-mentioned machine process.

At this point, for a material used in manufacturing the first mold, a resin material may be used, and more preferably, a metal material my be used considering durability.

Further, to lengthen even more a life of the first mold obtained through the above-mentioned machine process, a second mold having an intaglio may be duplicated from the first mold and then a third mold having a relief may be again duplicated from the second mold and used for manufacturing the prism sheet. If necessary, after the second molds are duplicated through mass production, the third molds are duplicated from the second molds and may be used as relief molds for producing the prism sheet of the present invention.

As described above, according to the present invention, polypyramid-shaped optical unit structures are provided in form of an intaglio type on one side of the prism sheet, whereby light from all directions including up, down, left, and right is concentrated and a brightness increase/decrease can be achieved.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A prism sheet of an LCD (liquid crystal display) comprising:
   a body part made of a transparent resin material; and
   a plurality of substantially polypyramid-shaped optical unit structures formed in an intaglio type on the body part, wherein the plurality of optical unit structures have intaglio-type substantially polypyramid shapes in an inside of substantially polygonal structures, a center of an intaglio portion substantially corresponding to a vertex of the polypyramid, thereby forming a point.

2. The prism sheet according to claim 1, wherein the intaglio-type polypyramid shape is of an intaglio-type cubic structure in which vertexes of more than three isosceles triangle planes meet at a center of the intaglio portion.

3. The prism sheet according to claim 2, wherein the isosceles triangle plane acts as a refraction surface of light and the isosceles triangle planes are provided in an even number, constituting an intaglio-type polypyramid.

4. The prism sheet according to claim 1, wherein the transparent resin material constituting the body part includes one of PET (Polyethyleneterephthalate) and PC (Polycarbonate).

5. The prism sheet according to claim 1, wherein the optical unit structure includes PMMA (Polymethylmethacrylate).

6. The prism sheet according to claim 1, wherein small-sized protuberances as structures for diffusing light are embossing-processed and formed on a surface of the body opposite to a surface of the body part where the optical unit structures are formed.

7. The prism sheet according to claim 1, wherein grains made of PMMA (Polymethylmethacrylate) are provided.

8. The prism sheet according to claim 1, wherein a relief-molded intaglio PMMA (Polymethylmethacrylate) material is made into an is formed on the body part such that the plurality of intaglio-type optical unit structures are combined with the body part once uv-hardened.

9. The prism sheet according to claim 1, wherein a relief mold is a metal surface having a substantially curved surface or a flexible resin surface, considering its exfoliation property and handling property.

10. The prism sheet according to claim 1, wherein a depth (h) of the intaglio-type optical unit structure is substantially greater than at least about one-fourth of a shortest distance (p) between central points of the intaglio-type optical unit structures.

11. The prism sheet according to claim 1, wherein a depth h of the intaglio-type optical unit structures is substantially greater than at least about 10 μm.

12. The prism sheet according to claim 1, wherein in case one side of the prism sheet on which the optical unit structures are formed is a light outputting surface, a depth (h) of the optical unit structures is formed in a range of about 0.3-0.6 times a shortest distance (p) between central points.

13. The prism sheet according to claim 1, wherein in case one side of the prism sheet on which the optical unit structures are formed is a light receiving surface, a depth (h) of the optical unit structures is formed in a range of about 0.5-0.8 times a shortest distance (p) between central points.

14. A backlight unit of an LCD comprising:
a lamp;
a light guide plate arranged in one end of the lamp;
a reflective plate arranged on a lower part of the light guide plate; and
a diffusion sheet and a prism sheet arranged on an upper part of the light guide plate, wherein the prism sheet has a body part made of a transparent resin material and a plurality of optical unit structures having an intaglio type substantially polypyramid shape in an inside of substantially polygonal structures on the body part, a center of an intaglio portion of the optical unit structures substantially corresponding to a vertex of the polypyramid, thereby forming a point.

15. The backlight unit according to claim 14, wherein the lamp is formed in a substantially "L" shape so as to simultaneously provide light to two non-facing sides of the light guide plate.

16. The backlight unit according to claim 13, wherein a plurality of protrusions are formed on the light guide plate.

17. The backlight unit according to claim 13, wherein one side of the prism sheet, on which the optical unit structures are formed is arranged facing the light guide plate.

18. A method of forming a prism sheet having a body part made of a transparent resin material; and a plurality of substantially polypyramid-shaped optical unit structures formed in an intaglio type on the body part, wherein the plurality of optical unit structures have intaglio-type substantially polypyramid shapes in an inside of substantially polygonal structures, a center of an intaglio portion substantially corresponding to a vertex of the polypyramid, thereby forming a point, the method comprising:

providing a body part including a transparent resin;
providing a liquid PMMA (Polymethylmethacrylate) material to a relief mold on a first surface of the body part;
and hardening the liquid PMMA.

19. The method of forming prism sheet according to claim 18, wherein the relief mold is manufactured by forming a relief on a metal surface having a substantially curved surface or by forming a relief on a flexible resin surface, considering its extraction property and handling property.

20. The method of forming a prism sheet according to claim 18, further comprising embossing a second surface of the body part with small-sized protuberances, wherein the second surface is opposite the surface of the body part on which the polypyramid-shaped optical unit structures are formed.

21. The prism sheet according to claim 18, wherein a liquid PMMA (Polymethylmethacrylate) material is made into an intaglio through a relief mold and is formed on the body part and then hardened by an ultraviolet hardening method, such that the plurality of intaglio-type optical unit structures are combined with the body part.

* * * * *

UNITED STATES PATENT AND TRADEMARK OFFICE
CERTIFICATE OF CORRECTION

PATENT NO.         : 7,252,428 B2                                              Page 1 of 1
APPLICATION NO. : 11/024767
DATED                 : August 7, 2007
INVENTOR(S)       : Sang Gon Lee et al.

It is certified that error appears in the above-identified patent and that said Letters Patent is hereby corrected as shown below:

Title Page Should read

(73)    Assignee:    LG Electronics, Inc., Seoul (KR)

and

Miraenanotech Co., Ltd., Seoul (KR)

Signed and Sealed this

Fifth Day of August, 2008

JON W. DUDAS
*Director of the United States Patent and Trademark Office*